US011229203B2

(12) United States Patent
Cadle-Davidson et al.

(10) Patent No.: US 11,229,203 B2
(45) Date of Patent: Jan. 25, 2022

(54) METHOD OF FORMULATION OF COMBINED MICROBE AND AGRICULTURAL CHEMISTRY, MICROBE-DERIVATIVE COMPOSITION, AND USE OF SAME

(71) Applicant: Advanced Biological Marketing, Inc., Geneva, NY (US)

(72) Inventors: Molly Cadle-Davidson, Geneva, NY (US); Gary Harman, Geneva, NY (US)

(73) Assignee: Agrauxine Corp., Milwaukee, WI (US)

(*) Notice: Subject to any disclaimer, the term of this patent is extended or adjusted under 35 U.S.C. 154(b) by 0 days.

(21) Appl. No.: 16/170,359

(22) Filed: Oct. 25, 2018

(65) Prior Publication Data

US 2019/0116804 A1    Apr. 25, 2019

Related U.S. Application Data

(60) Provisional application No. 62/576,682, filed on Oct. 25, 2017.

(51) Int. Cl.
| | | |
|---|---|---|
| *A01N 25/04* | (2006.01) | |
| *A01N 43/80* | (2006.01) | |
| *A01N 37/46* | (2006.01) | |
| *A01N 43/36* | (2006.01) | |
| *A01N 43/50* | (2006.01) | |
| *A01N 37/22* | (2006.01) | |
| *A01N 43/653* | (2006.01) | |
| *A01N 51/00* | (2006.01) | |
| *A01N 31/02* | (2006.01) | |
| *A01N 63/38* | (2020.01) | |

(52) U.S. Cl.
CPC ............ *A01N 37/46* (2013.01); *A01N 25/04* (2013.01); *A01N 31/02* (2013.01); *A01N 37/22* (2013.01); *A01N 43/36* (2013.01); *A01N 43/50* (2013.01); *A01N 43/653* (2013.01); *A01N 43/80* (2013.01); *A01N 51/00* (2013.01); *A01N 63/38* (2020.01)

(58) Field of Classification Search
USPC ....................................................... 504/258
See application file for complete search history.

(56) References Cited

U.S. PATENT DOCUMENTS

| | | | | |
|---|---|---|---|---|
| 5,702,701 | A * | 12/1997 | O'Donnell ............ | A01N 63/00 424/93.46 |
| 6,306,386 | B1 | 10/2001 | Cole et al. | |
| 2004/0176249 | A1 | 9/2004 | Prieto | |
| 2010/0028303 | A1* | 2/2010 | Martin, Jr. ............ | A01N 63/04 424/93.5 |
| 2013/0130898 | A1* | 5/2013 | Gewehr ................ | A01N 43/40 504/116.1 |
| 2014/0201870 | A1* | 7/2014 | Harman ................ | C12R 1/885 800/298 |
| 2015/0150261 | A1* | 6/2015 | Liptay ................... | A01N 47/34 504/328 |
| 2015/0305348 | A1* | 10/2015 | Andersch .............. | A01N 63/04 504/100 |

FOREIGN PATENT DOCUMENTS

| | | |
|---|---|---|
| EP | 1364579 A1 | 11/2003 |
| WO | 95/00020 A2 | 1/1995 |
| WO | 95/10597 A | 4/1995 |
| WO | 2002/13608 A1 | 2/2002 |
| WO | 2008/062413 A2 | 5/2008 |
| WO | 2008/063751 A2 | 5/2008 |
| WO | 2009/091557 A1 | 7/2009 |
| WO | 2009/126473 A1 | 10/2009 |
| WO | 2010/009241 A2 | 1/2010 |
| WO | 2010/091337 A1 | 8/2010 |
| WO | 2011/037448 A1 | 3/2011 |
| WO | 2013/078365 A1 | 5/2013 |
| WO | 2013/116454 A1 | 8/2013 |
| WO | 2014/147528 A1 | 9/2014 |
| WO | 2015/011615 A1 | 1/2015 |

(Continued)

OTHER PUBLICATIONS

Mohiddin et al., Journal of Pharmacognosy and Phytochemistry 2018; 7(1): 2118-2122.*
Int'l Search Report for co-pending Appln. No. PCT/US2018/057475, dated Jan. 23, 2019.
XP002787669, retrieved from STN Database accession No. 2003:44830 abstract CAS-RN 507238-84-8.

*Primary Examiner* — Johann R Richter
*Assistant Examiner* — Courtney A Brown
(74) *Attorney, Agent, or Firm* — Reising Ethington PC

(57) ABSTRACT

The present technology relates generally to compositions, methods and systems entailing one or more microbial species or microbe derivatives therefrom or combinations of a microbial species plus at least one microbe derivative, in combination with one or more agricultural chemicals such as a fungicide, an insecticide, a nematicide, a bacteriocide, an herbicide or a mixture thereof for application to crops for enhanced growth and performance. The microbial species are preferably selected from the group consisting of *Trichoderma virens, Trichoderma atroviride, Trichoderma afroharzianum, Trichoderma* strain K1, *Trichoderma* strain K2, *Trichoderma* strain K3, *Trichoderma* strain K4, *Trichoderma* strain K5 and mixtures thereof. The microbe derivatives are preferably microbial metabolites selected from the group consisting of 6-pentyl pyrone, harzianic acid, hydra 1, harzinolide, 1-octene-3-ol and mixtures thereof. The compositions are preferably applied to seeds of the crop or by any of the common methods onto the crop in the field.

4 Claims, 11 Drawing Sheets

(56) References Cited

FOREIGN PATENT DOCUMENTS

| WO | 2016/071136 A1 | 5/2016 |
| WO | 2017/060682 A1 | 4/2017 |
| WO | 2017/192117 A1 | 11/2017 |
| WO | 2018/080596 A1 | 5/2018 |
| WO | 2018/183976 A1 | 10/2018 |
| WO | 2018/183977 A1 | 10/2018 |

* cited by examiner

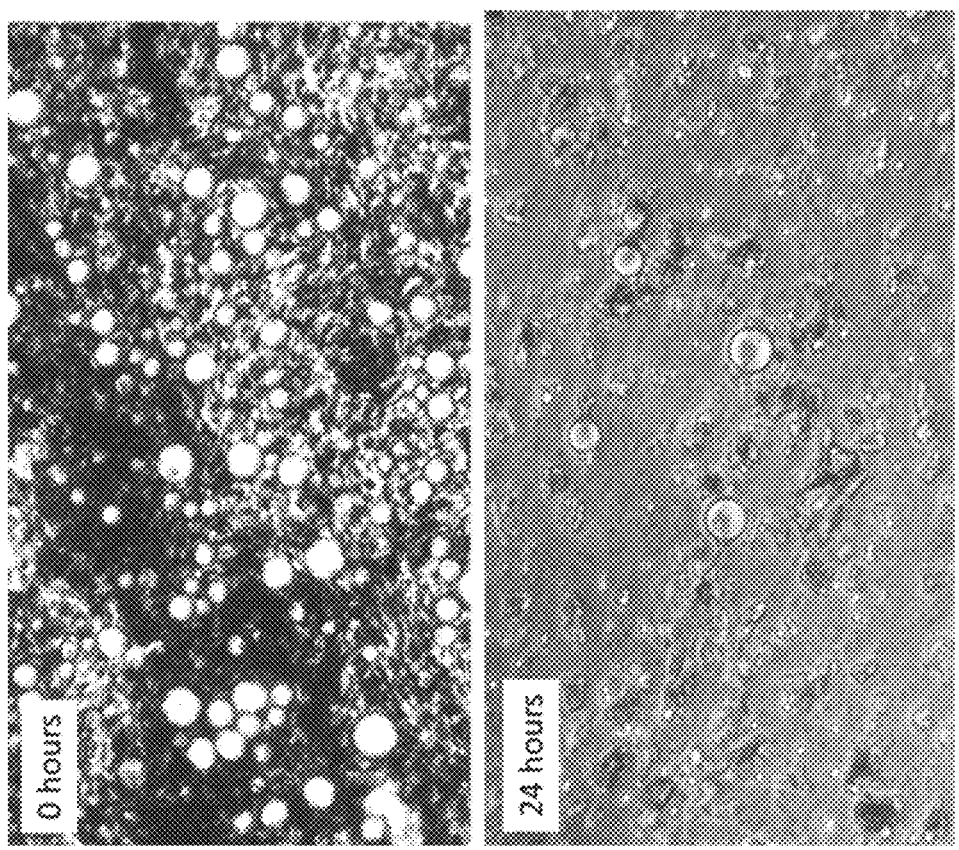

Bars labeled with the same letter are not significantly different at alpha = 0.1.

Bars labeled with the same letter are not significantly different at alpha = 0.1.

Bars labeled with the same letter are not significantly different at alpha = 0.1.

METHOD OF FORMULATION OF COMBINED MICROBE AND AGRICULTURAL CHEMISTRY, MICROBE-DERIVATIVE COMPOSITION, AND USE OF SAME

RELATED APPLICATION DATA

This application claims the benefit of U.S. Provisional Application No. 62/576,682, filed Oct. 25, 2017, the entire disclosure of which is hereby incorporated by reference as if set forth fully herein.

STATEMENT REGARDING FEDERALLY SPONSORED RESEARCH OR DEVELOPMENT

Not Applicable

STATEMENT REGARDING PARTIES TO A JOINT RESEARCH AGREEMENT

Not Applicable

REFERENCE TO SEQUENCE LASTING, TABLE, OR COMPUTER PROGRAM LISTING

Not Applicable

STATEMENT REGARDING PRIOR DISCLOSURES BY THE INVENTOR OR A JOINT INVENTOR UNDER 37 C.F.R. 1.77(B)(6)

Not Applicable

TECHNICAL FIELD

This disclosure relates generally to compositions and methods of a highly effective microbe or microbe-derived agricultural chemical or chemical mix formulation for improving plant vitality in the presence or absence of herbicides and/or pesticides.

BACKGROUND ART

The following description is provided to assist the understanding of the reader. None of the information provided or references cited is admitted to be prior art to the present invention.

Use of microbial or microbially-derived products in agriculture has become commonplace as more and more companies are investing in sustainable agricultural products. It is broadly recognized that chemicals and the chemical industry play vital roles in agriculture. However, changing agricultural attitudes manifested as the growth of organic production or the increasing regulation of neonicotinoids and many other chemical pesticides are leading to changes in how chemicals are viewed, produced, and used. The combination of these two factors: growth of biological solutions and limitations on chemistry, lead to the desire to produce agricultural chemistries that are more acceptable to consumers with value-added traits sometimes only derived from biological organisms.

SUMMARY

Agriculture uses many concentrated mixtures of fungicides and insecticides, all in a matrix, frequently liquid, that typically contains surfactants and other adjuvants. Agricultural dealers and suppliers have an increasing interest in combining microbial or microbe-derived materials into these mixes. The present disclosure provides methods to formulate microbes and microbe-derived materials into these toxic chemical mixtures so that useful formulations of microbial agents or microbe-derived products, each having a sufficient shelf life, can be produced.

The present technology relates generally to compositions, methods and systems entailing one or more microbial agents or derivatives thereof or combinations of microbe plus microbe derivative, in combination with one or more agricultural chemicals such as a fungicide, insecticide, nematicide, bacteriocide, herbicide or other, singly or in any combination of the above.

The present technology describes mixtures of pesticidal formulations and biologicals that are formulated to provide specific quantities of biologicals and chemicals that are specific to the use rates of each component to provide the rates for each component used separately, 1 gram (g) of dry spores of *Trichoderma virens* was mixed with 10 milliliters (ml) of soybean oil. This forms a stable suspension of spores in oil. This suspension was mixed at the rate of 9.5 ml with 16.7 ml of a concentrated commercial pesticide mixture "L" ("ChemL"). The ChemL mixture comprises Oxathiapiprolin.

In another embodiment, 1 g of spores of *Trichoderma atroviride* was mixed with 20 ml of soybean oil to form an oil suspension as before 3 ml of this mixture were combined with 45 ml of a commercial pesticide mixture "S" ("Chem S"). The Chem S mixture comprises a mixture of Tebuconazole, Imidacloprid, Metalaxyl and Fludioxonil. In both cases, proportions were determined by the recommended application rate by the manufacturer of both components. Thus, according to the properties of the dry spores used and the use rate of the chemical component, different ratios are required.

Traits of interest include growth promotion, disease control, pest resistances, abiotic stress resistance, and overall increases in performance. Many of these traits can be achieved by application of one or more chemicals, however chemicals rarely persist in an effective form throughout the season which then necessitates multiple applications. Therefore, a product that combines technologies, chemistry and biologicals, can be created that provides the best that each can offer individually: acute efficacy of the chemical or chemical mix combined with the long term interaction and stimulation of the target plant by the biologicals or biological derivative.

The present disclosure has been made in view of the above-mentioned circumstances, and has as an object to encourage growth promotion, disease control, pest resistances, abiotic stress resistance, and overall increases in performance of crop plants.

The embodiments disclosed in this application to achieve the above-mentioned object has various aspects, and the representative aspects are outlined as follows. With parenthetical reference to the corresponding parts, portions or surfaces of the disclosed embodiment, merely for the purposes of illustration and not by way of limitation, the present disclosure provides a composition comprising one or more microbes in combination with one or more agricultural chemicals, wherein said agricultural chemicals include any multiple or combination of fungicide, insecticide, nematicide, bacteriocide, herbicide, or other chemicals commonly applied onto the seeds, in the furrow, by soil drench, by root dip, by foliar spray, by side dress, or by other means to a crop, wherein said one or more microbes are *Trichoderma virens*, *Trichoderma atroviride*, *Trichoderma afroharzianum*, *Trichoderma* strains K1, K2, K3, K4, K5, and combinations thereof. The *Trichoderma* strains K1 to K5 are defined by their ATCC or NRRL number herein.

Further provided is a composition comprising one or more microbe-derived compounds in combination with one or more agricultural chemicals, wherein said agricultural chemicals include any multiple or combination of fungicide, insecticide, nematicide, bacteriocide, herbicide, or other chemicals commonly applied on the seeds, in the furrow, by soil drench, by root dip, by, foliar spray, by side dress, or by other means to a crop, wherein said one or more microbe-derived compounds are metabolites including at last one of 6-pentyl pyrone, harzianic acid, hydtra 1, harzinolide and 1-octene-3-ol, and further including one or more microbes, wherein said one or more microbes art *Trichoderma virens*, *Trichoderma antroviride*, *Trichoderma afroharzianum*, *Trichoderma* strains K1, K2, K3, K4, or K5, and combinations thereof.

Also provided is a composition comprising one or more microbes, plus one or more microbe-derived compounds in combination with one or more agricultural chemicals, wherein said agricultural chemicals include any multiple or combination of fungicide, insecticide, nematicide, bacteriocide, herbicide, or other chemicals commonly applied onto the seeds, in the furrow, by soil drench, by root dip, by foliar spray, by side dress, or by other means to a crop, wherein said one or more microbes are *Trichoderma virens*, *Trichoderma atroviride*. *Trichoderma afroharzianum*, *Trichoderma* strains K1, K2, K3, K4, or K5, and combinations thereof, wherein said one or more microbe-derived compounds are metabolites including at least one of 6-pentyl pyrone, harzianic acid, hydtra harzinolide and/or 1-octene-3-ol.

Figure 1:
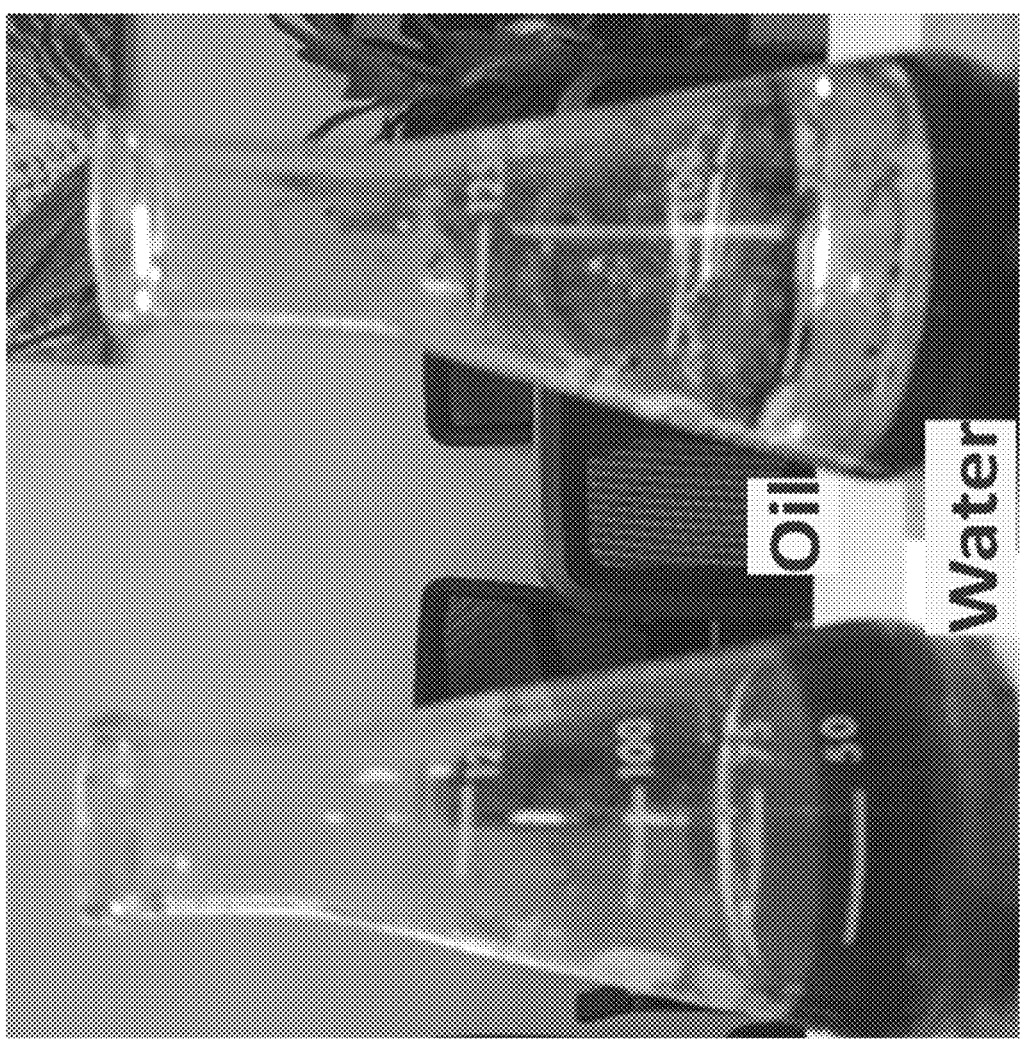
FIG. 1 is an image showing the adjustable compatibility of *Trichoderma* spores depending on the aqueous or lipid nature of the solution they are suspended in. Dry spores suspended in water will not mix with an oil layer but rather remain in the water phase as shown in the beaker on the right side of FIG. 1. Likewise, dry spores suspended in oil will be retained in the oil phase when subsequently mixed with water as shown on the left side of FIG. 1.

FIG. 2 is an image showing a physically layered "parfait" formulation. An aqueous agricultural chemical solution, a Saliva® insecticide on the bottom is further separated from the oil-based suspension of *Trichoderma* spores in the top section by an oil, wax, or other physical barrier.

FIG. 3 is a graph showing stability of an oil-based spore suspension of *Trichoderma* K5 formulated with commercial pesticide mixture S over time compared to the oil-based suspension alone or the oil-based suspension in water. Spore viability through six months is shown.

FIG. 4A is an image showing the formation of microbeads of *Trichoderma* spores, an oil-based microemulsion, in water over a 24 hour period.

FIG. 4B is a parallel image to FIG. 4A showing microbeads/emulsion formation of the same *Trichoderma* formulation as in FIG. 4A in undiluted commercial pesticide mixture S.

FIG. 5 is a graph showing the stability of the spore-oil microbeads/emulsions shown in FIGS. 4A and 4B over 11 days of storage.

FIGS. 6A and 6B include graphs showing a field level performance of an oil-based spore suspension of *Trichoderma* K2 formulated with the commercial pesticide mixture S having been applied at the recommended rates for both components to wheat seeds. Plant weight is shown in FIG. 6A and plant height in FIG. 6B, both are measures of biomass.

FIG. 7A is a graph showing the functionality of *Trichoderma* spores, commercial pesticide mixture S and the combination formulated as described herein in controlling soil-borne *Rhizoctonia* infection/damage. Percent germination is shown.

FIG. 7B shows a series of images of representative wheat seedlings from which the data shown in FIG. 7A was collected.

FIG. 8 is a graph showing the stability and spore viability of two formulations of *Trichoderma* K5 described herein alone or in combination with commercial pesticide mixture L over time. Approximately two months of shelf-stable viability is shown.

DESCRIPTION OF THE PREFERRED EMBODIMENTS

It is to be appreciated that certain aspects, modes, embodiments, variations and features of the invention are described below in various levels of detail in order to provide a substantial understanding of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It win be readily understood that the aspects of the present disclosure, as generally described herein, and illustrated in the figures, can be arranged, substituted, combined, separated, and designed in a wide variety of different configurations, all of which are explicitly contemplated herein.

Unless defined otherwise, all technical and scientific terms used herein generally have the same meaning as commonly understood by one of ordinary skill in the art to which this invention belongs. As used in this specification and the appended claims, the singular forms "a," "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art. All references cited herein are incorporated herein by reference in their entireties and for all purposes to the same extent as if each individual publication, patent, or patent application was specifically and individually incorporated by reference in its entirety for all purposes.

The *Trichoderma* strains K1-K5 in the present specification and claims are defined as follows. *Trichoderma* K1 is a *Trichoderma virens* strain with an ATCC number of 20906 and was disclosed in U.S. Pat. Nos. 4,996,157 and 5,165,928. *Trichoderma* K2 is a *Trichoderma afroharzian* strain with an ATCC number of PTA-9708 and was disclosed U.S. Pat. No. 8,716,001. *Trichoderma* K3 is a *Trichoderma*

*afroharzian* strain with an ATCC number of PTA-9709 and was disclosed in U.S. Pat. No. 8,877,481 *Trichoderma* K4 is a *Trichoderma atroviride* strain with an ATCC number of PTA-9707 and was disclosed in U.S. Pat. No. 8,877,480. *Trichoderma* K5 is a *Trichoderma atroviride* strain with a NRRL number of B-50520 and was disclosed in international application number PCT/US2012/066329.

In one aspect, the present disclosure relates to compositions and methods of a microbe or microbe-derived agricultural chemical or chemical mix formulation for improving plant vitality in the presence of herbicides and/or pesticides. Further, the present disclosure relates to compositions and methods entailing one or more microbial agents or derivatives thereof or combinations of microbe plus microbe derivate, in combination with one or more agricultural chemicals such as fungicide, insecticide, nematicide, herbicide or bacteriocide either singly or in any combinations thereof.

The microbes or microbe derivatives lead to the production of metabolites. These metabolites initiate plant signaling which leads to the upregulation of gene expression pathways. This upregulation yields numerous physiological changes in plants, including enhanced photosynthetic activity, resistance to pests, resistance to biotic stress, resistance to abiotic stress, improved nutritional quality, larger and deeper roots, improved nitrogen use, and increased carbon sequestration. Major practical effects of these physiological changes are higher crop yields and decreased atmospheric carbon.

The present disclosure allows for the application of these microbes and microbe derivatives to plant roots in the presence of agricultural chemicals such as fungicide, insecticide, nematicide, herbicide, or other, singly or in any combinations thereof. In illustrative embodiments, commercial pesticide mixtures "S" and "L" are used. Pesticide mixtures S and L are defined herein. In further embodiments the commercial pesticide mixtures may comprise, for example, any combination of a fungicide, an insecticide, a nematicide, a bacteriocide, are herbicide, a surfactant, an emulsifier or a coloring agent.

In an illustrative embodiment, 1 g of dry *Trichoderma virens* spores was mixed with 10 ml of soybean oil, forming a stable suspension of *T. virens* spores in oil. 9.5 ml of this suspension was mixed with 16.7 ml of concentrated pesticide mixture L as defined herein.

In another illustrative embodiment, 1 g of *Trichoderma atroviride* was mixed with 20 ml of soybean oil, forming a stable suspension of *T. atroviride* spores in oil. 3 ml of this mixture was combined with 45 ml of pesticide mixture S as defined herein.

In other illustrative embodiments, a *Trichoderma* strain such as K1, K2, K3, K4, or K5 was mixed with soybean oil, forming a stable suspension of the *Trichoderma* spores in oil. This mixture was combined with an agricultural chemical such as a fungicide, insecticide, nematicide, bacteriocide, or herbicide.

In another illustrative embodiment, spores of *Trichoderma* strains representing species *virens* (ATCC 20906), *afroharzianum* (ATCC PTA9708), and *atroviridae* (NRRL B-50520) were suspended soybean oil at one gram (~$5 \times 10^9$ colony forming units (cfus)) per 10 ml of oil. This suspension was mixed with commercial pesticides containing one or more of the following: Tebuconazole, Imidacloprid, Metalaxyl, Fludioxonil, and Oxathiapiprolin in addition to the inactive ingredients associated with each. The ratio of the oil suspension to pesticide was determined by the EPA or manufacturer dictated application rate of the chemical in question and the target *Trichoderma* cfus per seed ranging from ~$10^4$ to $10^5$. In the case of a commercial mixture of Tebuconazole, Imidacloprid, Metalaxyl, and Fludioxonil, 3 ml of the oil suspension was mixed with 45 ml of the pesticide mixture. In the case of Oxathiapiprolin, 1 g of spores was suspended in 20 ml of soybean oil, and 9.5 ml of this was mixed with 16.8 ml of the commercial preparation of pesticide.

In the above embodiments, the proportions were determined by the recommended rate of application by the manufacturer of each commercial pesticide/fungicide/etc. component. Accordingly, different ratios are required based on the properties of the dry spores used and the use rate of the chemical component. All mixing was done manually, and no wait times were required during the mixing process.

*Trichoderma* spores will remain in whichever phase they are mixed in. Thus, if *Trichoderma* spores are mixed in oil, they will remain suspended in the oil and sequestered from water when the oil suspension is combined with water. Conversely, if *Trichoderma* spores are mixed in water, they will remain suspended in the water and sequestered from oil when the water suspension is mixed with oil. This property of *Trichoderma* spores results from the spores' production of hydrophobins. These proteins have both lipophilic and hydrophilic properties. When *Trichoderma* spores are mixed in oil, the spores exhibit "pseudo-encapsulation," which occurs when oil molecules form around the spores and prevent the spores from making contact with agricultural chemicals such as fungicide, insecticide, nematicide, herbicide, or other, singly or in any combinations thereof.

The present invention is further illustrated by the following examples, which should not be construed as limiting in any way.

Example 1—Formulation that Demonstrates Hydrophobic Properties on *Trichoderma* Spores

*Trichoderma* strains produce hydrophobins that have both lipophilic and hydrophilic properties. FIG. 1 demonstrates this essential property in that spores suspended in oil remain in the oil layer even when subsequently mixed with water as shown in the beaker on the left side of FIG. 1. Spores suspended in water remain in the water phase even when subsequently mixed with oil ash shown in the beaker on the right side of FIG. 1. This demonstrates that formulations can be created with either an oil or a water base and that the *Trichoderma* spores will remain sequestered from the opposite phase ingredients. That is, an oil-based suspension of *Trichoderma* spores will remain physically separated from ingredients/formulants dissolved or suspended in the aqueous phase of a combined formulation.

Example 2—Oil-Based Formulations of Dry Spores can be Constituted at a Higher Concentration than Water-Based Formulations of Spores Dry spores suspended in water take up additional water and increase in size whereas dry spores suspended in oil have no available water for uptake and retain their previous size and hydration Thus, oil-based formulations can be constituted up to ten times more concentrated than water-based formulations. As a result, oil-based suspensions of *Trichoderma* spores can be added to advanced aqueous formulations at the same concentration as water-based spore suspensions but using one-tenth the volume. In field applications, this volume savings is critical in minimizing changes in die chemistry formulation.

Figure 4A:
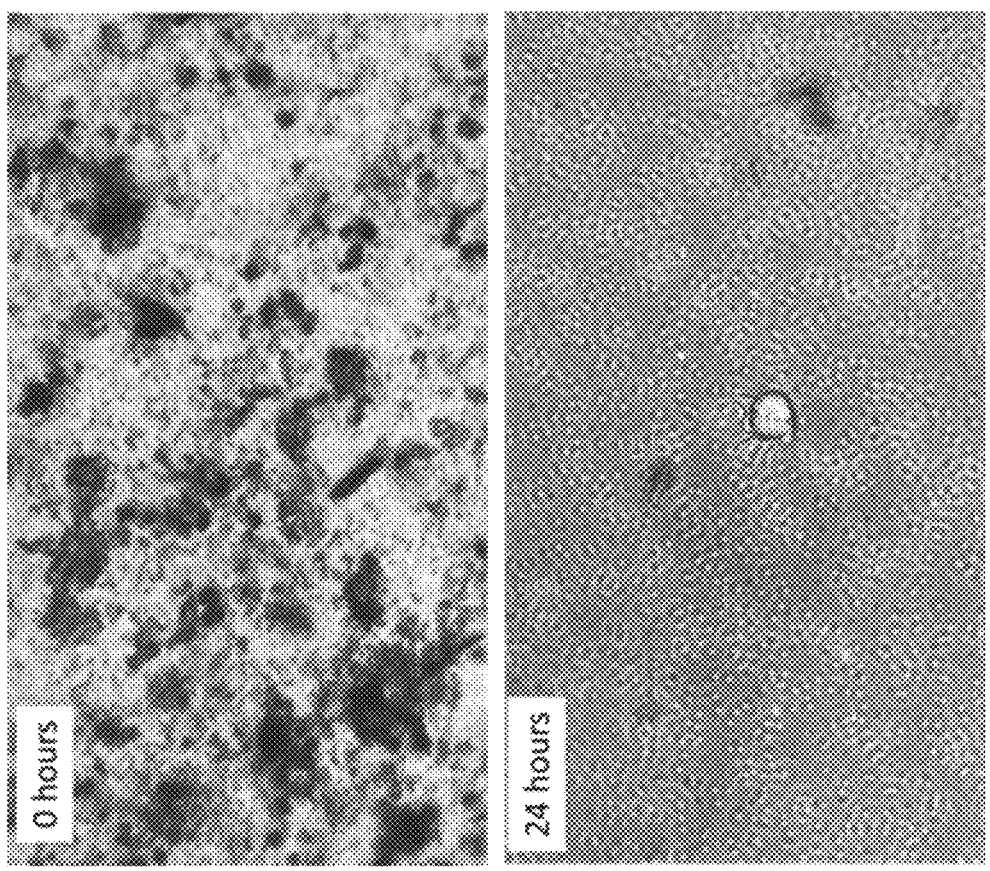
Figure 5:
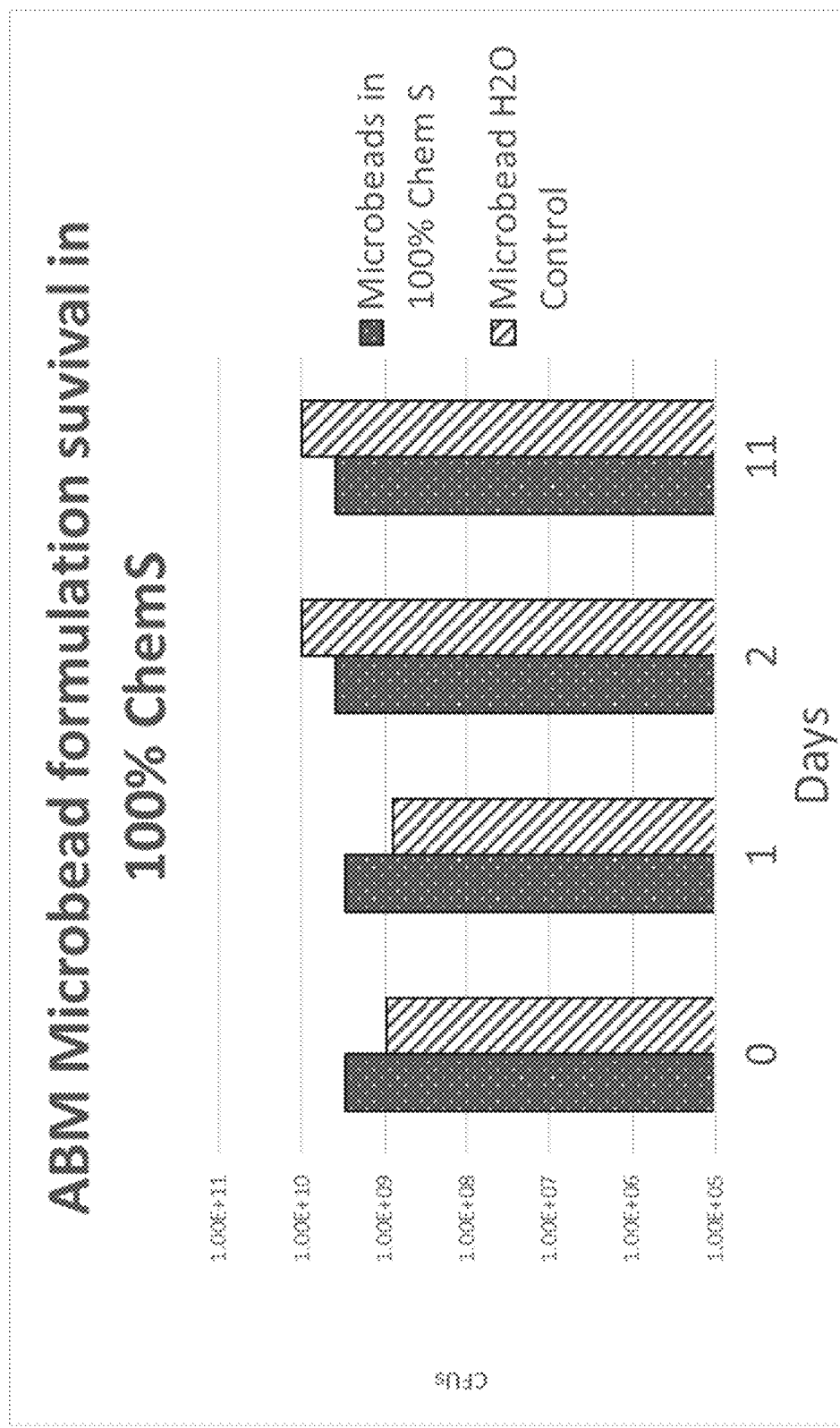
Figure 6A:
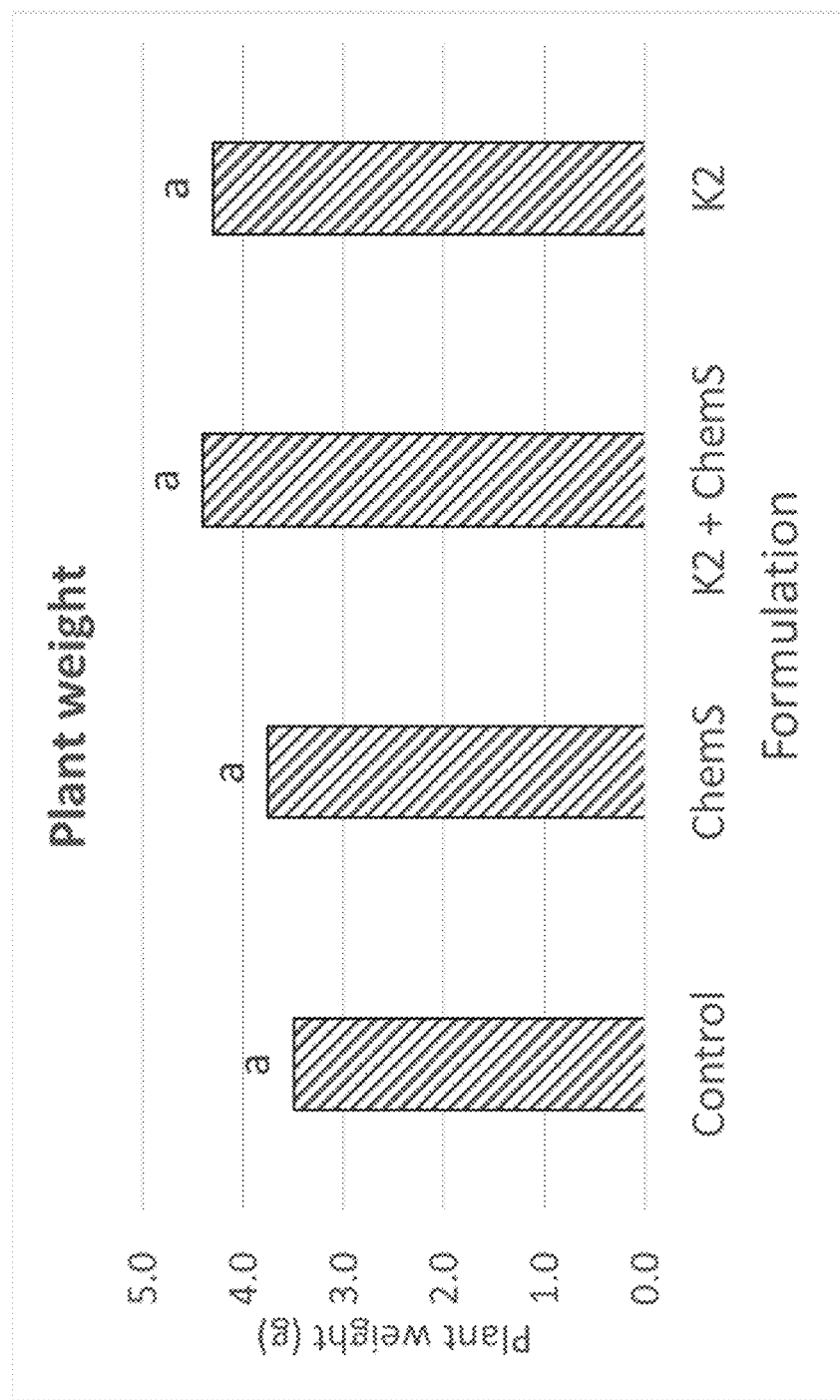
Figure 6B:
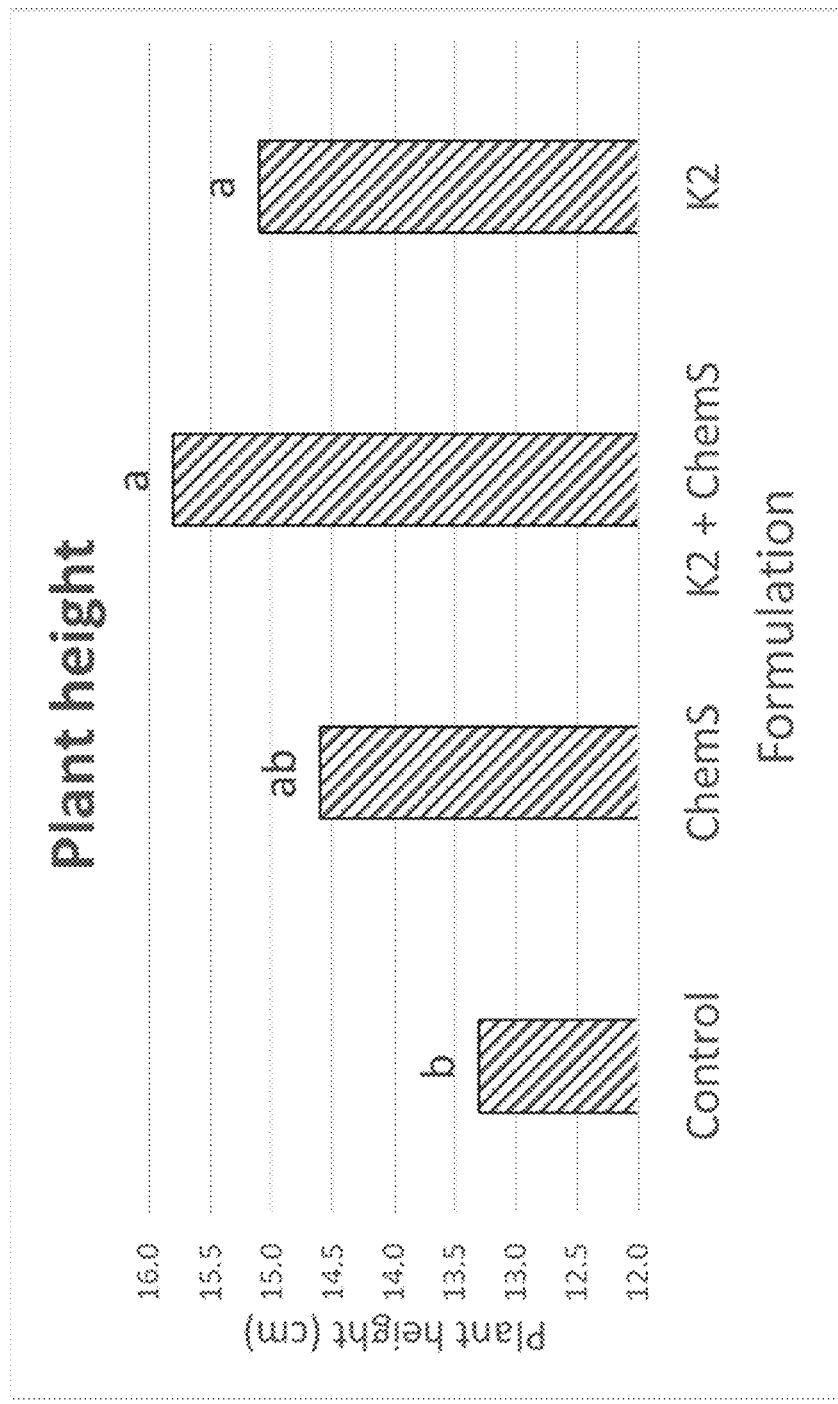
Figure 7A:
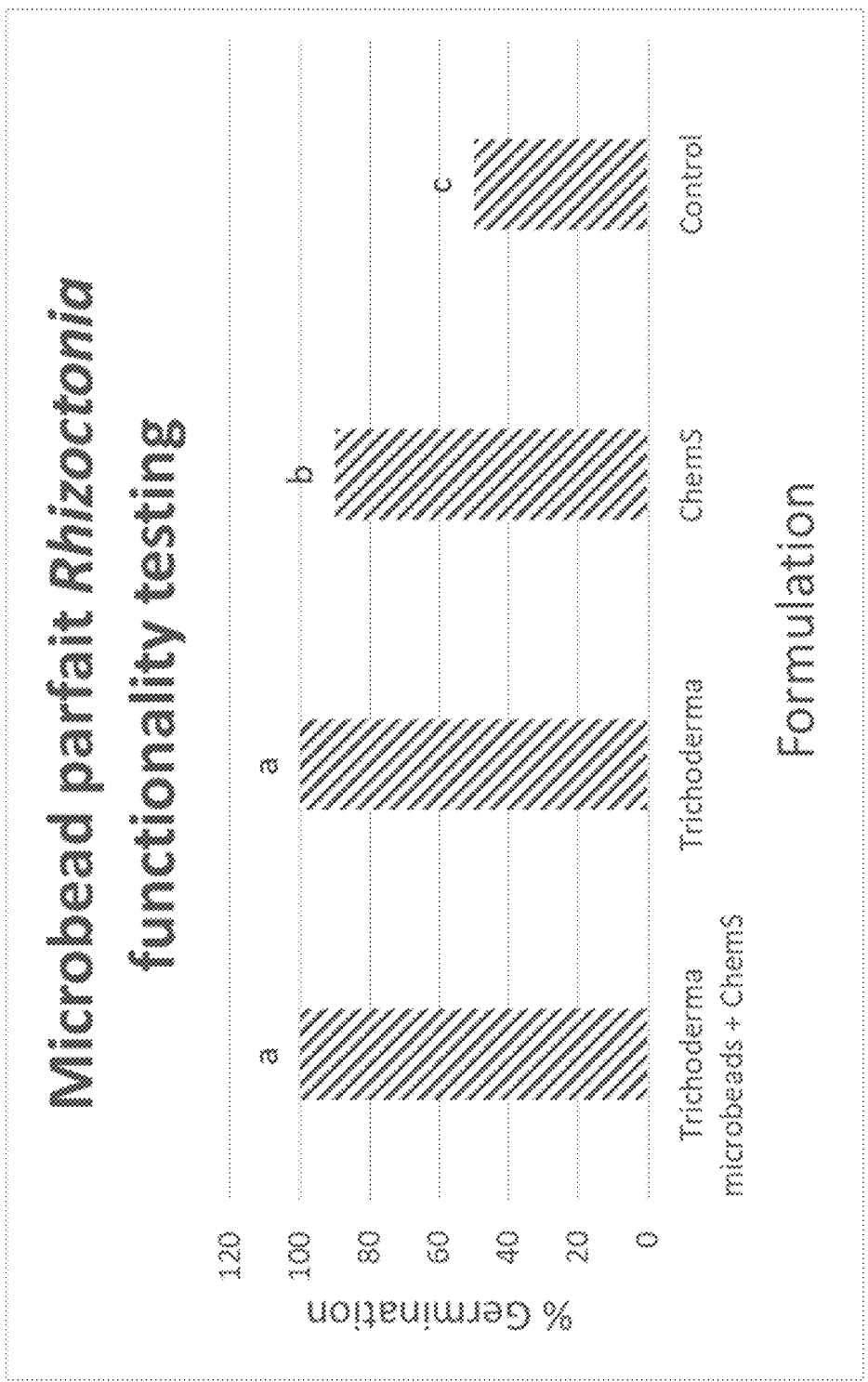
Figure 7B:
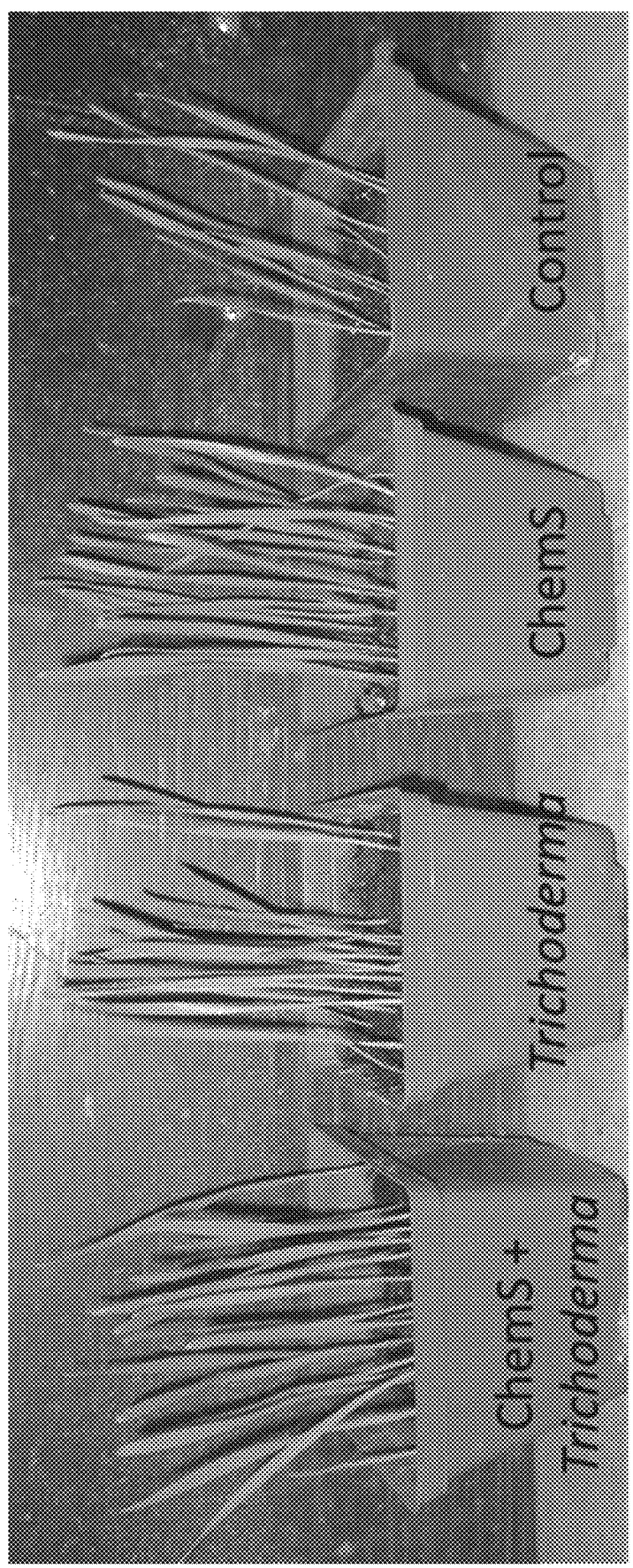

Example 3—Oil-Based Formulations of Dry Spores are Separated from Aqueous Suspensions for Solutions of Agricultural Chemistries FIGS. 4A, 4B and 5 demonstrate the formation of *Trichoderma* containing microbeads, oil-water microemulsions, and their survival in agricultural chemistries that include fungicides and an insecticide plus inert coformulants common to such chemistries. These microbeads and the oil layer persisting around the *Trichoderma* spores, owing to their hydrophobic wall component, maintain a physical separation between chemicals and inert ingredients that would otherwise be damaging to *Trichoderma*.

This hydrophobic character can be easily altered. It is a result of hydrophobins, which are proteins, as noted above. When spores are dry and they are mixed with water, they become suspended in water, and are not readily suspendable in oil, and vice versa. The hydrophobins reorient according to the liquid matrix, oil or water, in which they are suspended to provide this unique characteristic.

Figure 2:
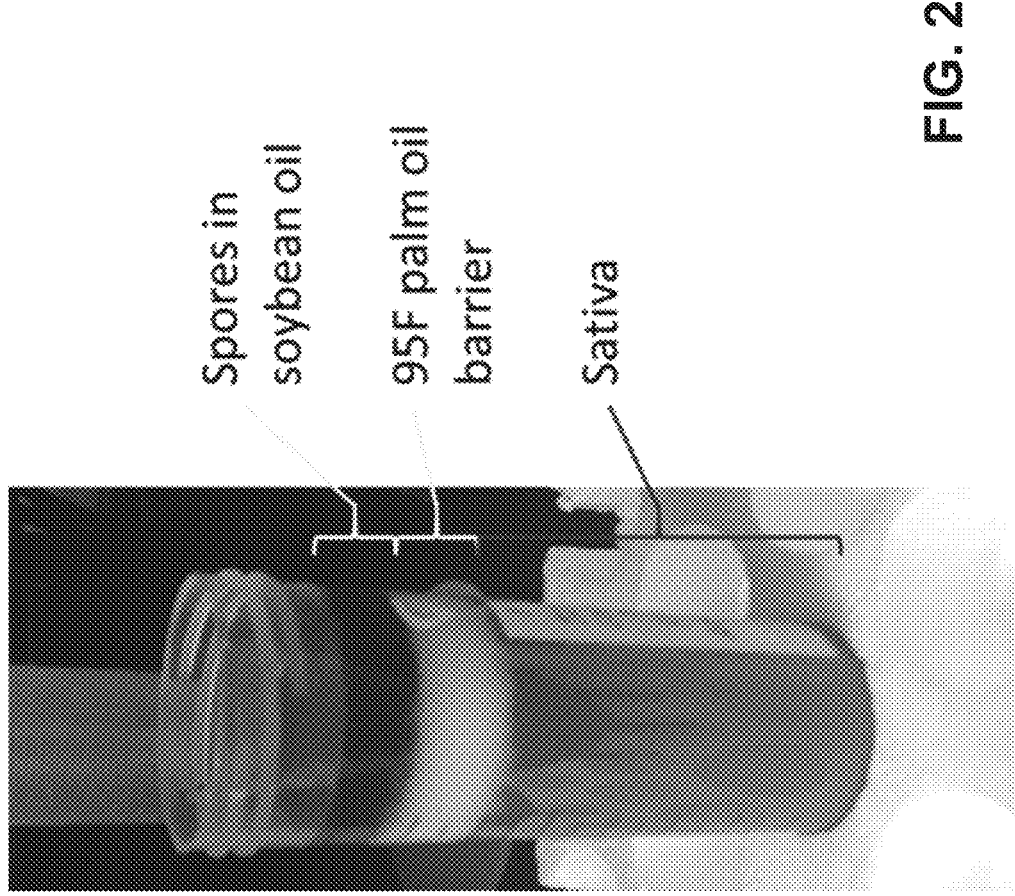

Example 4—Oil-Based Formulations of Dry Spores can be Separated Further from Aqueous Suspensions of Solutions of Agricultural Chemistries by the Creation of a Layered Structure with an Additional Oil or Wax Layer Between the Spore Suspensions and the Agricultural Chemistry A "parfait" is shown in FIG. 2 and can be used to further separate living spores from agricultural chemistry, i.e. the fungicide, insecticide, nematicide, herbicide, singly or in any combinations thereof. The intervening layer cart be composed of another oil, wax, or even a synthetic membrane through which neither the spore suspension nor the agricultural chemistry can pass. The Sativa® is a tradename of Nufarm for a series of agricultural chemical treatment products.

Figure 3:
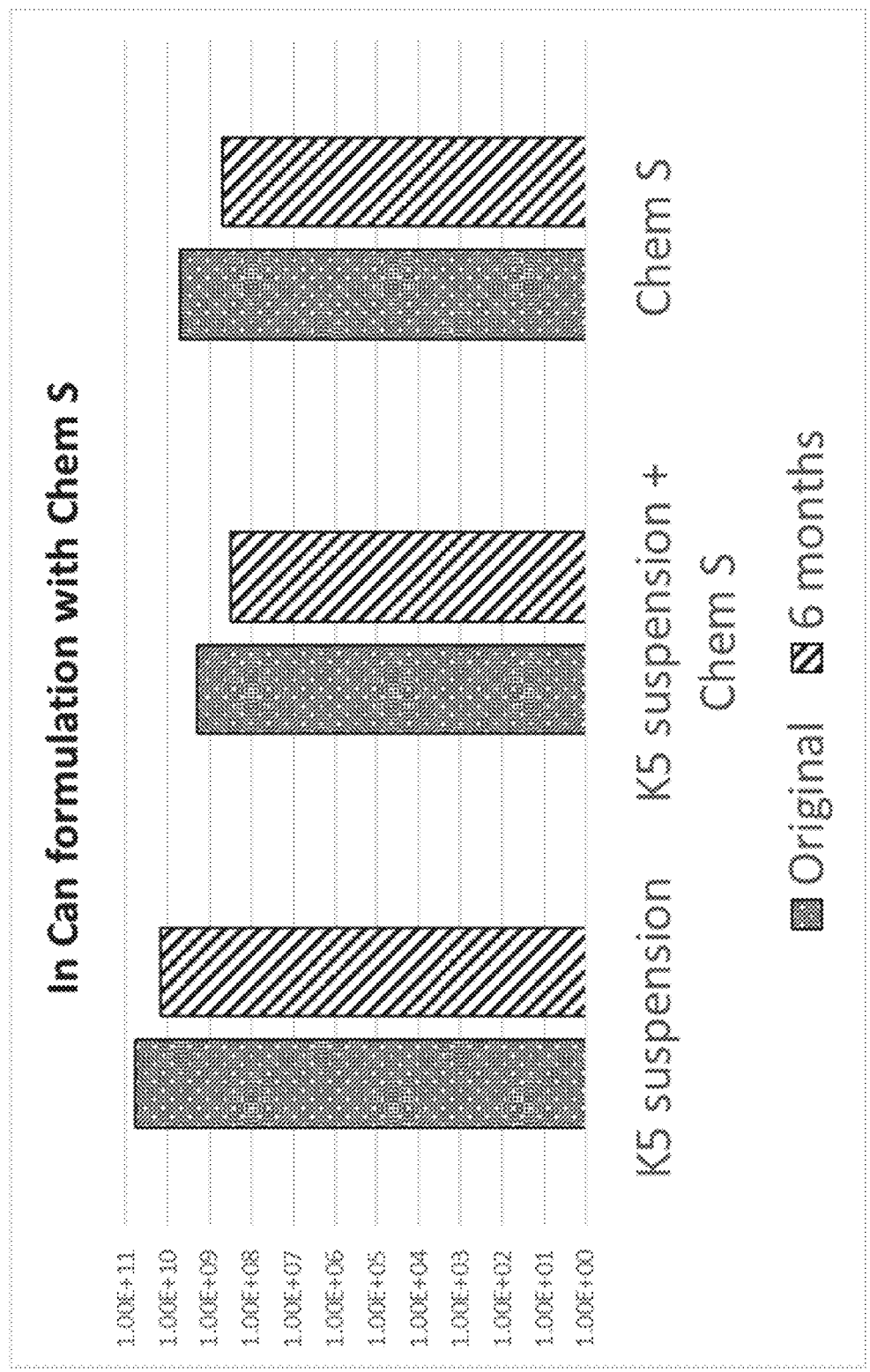
Figure 8:
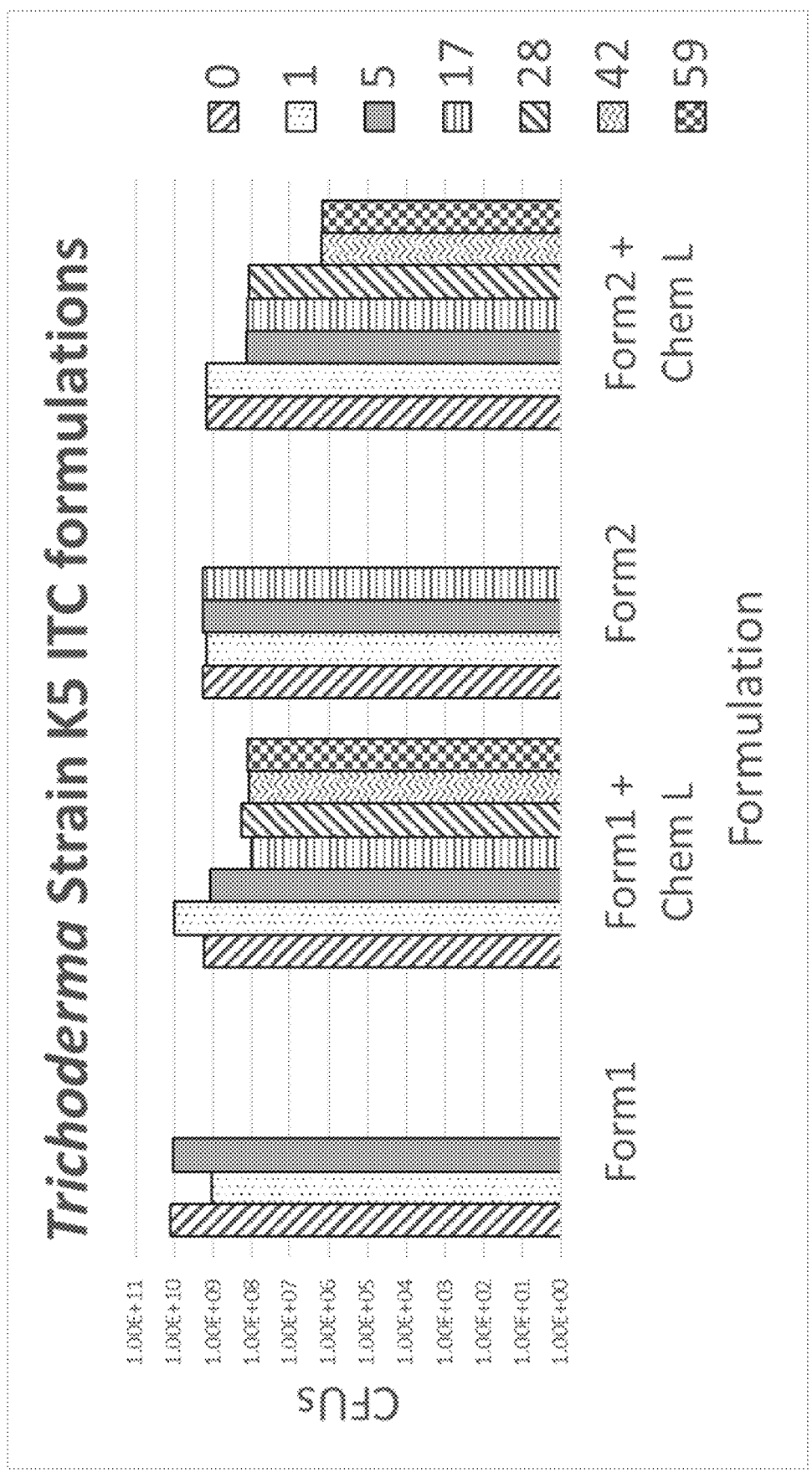

Example 5—Oil-Based Spore Formulations Show Viability Over Time Even when Combined with Agricultural Chemistries Including Fungicides and Other Commonly Used Agricultural Chemistries Oil-based spore suspensions formulated with two different agricultural chemistries, both containing fungicides, were tested over time. FIGS. 3 and 8 show these results which show the viability of *Trichoderma* K5 spores in agricultural chemistry formulations for nearly two months. It is expected that this shelf life can be extended further using the properties described herein.

Example 6—Oil-Based Spore Formulations Show Functionality Over Time Even when Combined with Agricultural Chemistries Including Fungicides and Other Commonly Used Chemistries Oil-based spore formulations combined with agricultural chemistries retain plant effects expected of both the *Trichoderma* K2 spores and the chemistry. FIGS. 6A, 6B, 7A and 7B demonstrate both the individual and combinatorial effects for this formulation. Bars having the same letter designations are not significantly different at alpha=0.1 while those with different letter designations are.

Example 7—Data Summary

*Trichoderma* oil-based formulations show excellent shelf-life in an oil substrate and at higher concentrations than is possible for an aqueous formulation of the same *Trichoderma* as discussed above. This property, likely dependent on the hydrophobin surface protein and other similar amphiphilic molecules, enables the formulation of spores or cells of any type in an oil solution that can then be combined with harsh agricultural chemistries in an aqueous solution/suspension By retaining the biological fraction of the *Trichoderma* formulation in one phase (oil) and the chemical and/or biocidal fraction of the agricultural chemistry in a separate phase (water), a physical barrier is established and maintained for an extended period of time. This relationship enables the development of desirable biological materials in the same jug or can as traditional chemistries, which is a valuable combination, in particular in light of evolving agricultural practices which are moving away from strictly chemical management practices.

Example 8—Use of Metabolites Derived from Microbial Agents

International application no PCT/US2018/025591 published as WO/2018/183977 describes tire discovery and use of chemical metabolites (entities) derived from the formulated strains used in the earlier examples, and is herein incorporated by reference in its entirety. These entities provide long-term effects similar to those of the fungal strains used in the earlier examples. Therefore, they are themselves chemicals that will be stable in chemical mixtures. These compounds are therefore an alternative to the use of the living microbes described above. Mixtures with these chemical entities provide the benefits of the living organisms. Both embodiments/systems are claimed in this patent application.

In particular, this present disclosure includes the capabilities of 1-octen-3-ol, which is a metabolite of *Trichoderma* strains and formulations thereof. The applicants have conducted basic and applied studies on the intricate interaction between beneficial endophytic root colonizing microbes and their hosts. A critical observation is that these organisms colonize only plant roots, but from this platform they induce system-wide changes in plant physiology. These system-wide changes occur as a consequence of triggering of plant responses including resistance to a wide variety of stresses, both biotic and abiotic, increased plant growth and yield and improved nutrient utilization.

Applicants have begun evaluating the triggering molecules released in the rhizosphere since applicants expected that they might have both commercial and basic scientific uses. The expectation was they would have beneficial effects upon plants. In research it was discovered that *T. harzianum* produces 1-octen-3-ol (mushroom alcohol) and that at very low concentrations in aerial solution it enhances plant growth and productivity, a result that could be duplicated by seed treatments with the compound at low concentrations.

Applicants expected that this compound as well as other microbial metabolites would have transitory but beneficial effects on plant growth, resistance to stresses and other advantages. However, as field trials were developed and conducted on seed treatments with this compound in field and large-scale laboratory tests, the effects were discovered to be neither transitory nor small. If seeds were treated with formulations containing only 0.7 µl/seed, season long effects were observed.

1-octen-3-ol is a volatile and apolar molecule. Results noted above were with a seed treatment in a very dilute aqueous suspension, but more stable formulations are necessary for commercial success. Any innovations must be packaged into formulations appropriate for agriculture. The active ingredient identified, however, is volatile, and so necessitates systems that (a) permit production of formulations that do not evolve the chemical in storage, but (b) release the chemical in soil when seeds are planted. What is required is a formulation that is stable when dry, but is activated by moisture. Ideally, the formulation would permit application of the innovation in a variety of types of products.

There is the potential to produce both seeds and fertilizers with treatments that confer resistance to drought or other benefits to corn and other crops. This cannot probably be done with microbial agents on fertilizers because the microbial will be killed by the release of salts from the fertilizers when they are applied to soils. However, it is possible to produce augmented, highly active fertilizers containing 1-octen-3-ol or other recently discovered triggers of plant responses. Fertilizers ought to be highly attractive to growers; either seed treatments or fertilizers could potentially be purchased that would provide numerous benefits (see FIGS. 1 and 2).

Specific advantages of 1-octen-3-ol are as follows:

A cyclodextrin formulation system, as is described in PCT/2018/025591 permits sequestration of 1-octen-3-ol within the core of the cyclodextrin molecule. The chemical without the sequestration is volatile and odorous, which is objectionable. The cyclodextrin formulation complex reduces or almost eliminates the volatility of the chemical in the dry state. This is important as a critical handling aspect but also to retain the active ingredient within the formulation, thereby permitting long term storage without loss of the chemical due to volatilization.

This allows the formulation of a dry product that can be used to coat either seeds or fertilizers. The dry formulation can be suspended in aqueous or nonpolar solvents, e.g., oils, and applied to the surface of seeds or fertilizers.

When the seeds or fertilizers are applied to agricultural systems in moist soil, the chemical is released. With the fertilizer application, the volatile nature of 1-octen-3-ol is an advantage since the volatile chemical will be released into soil and come into contact with germinating seeds. Volatile chemicals are expected to be more mobile in the soil system than ones that are nonvolatile.

The formulation systems can be applied to a variety of granular materials for use in plant agriculture or elsewhere. The examples above referred to granules of urea, but it can also be used to coat other types of granular fertilizers without limits. In addition, it can be used to coat any type of granules that may be used for agricultural applications or elsewhere. The specific of the coating containing the cyclodextrin-encapulated 1-octen-3-ol can vary but can be any type of aqueous suspension or emulsion. Such granules may be of different types and formulations that may or may not contain fertilizers.

The formulation systems designated here can be used with many other triggering compounds, signal molecules, or substances. 6-pentyl pyrone (6PP) can be used with the same cyclodextrin formulation described above for use with 1-octen-3-ol. Compounds useful in this disclosure include, from *Trichoderma*, 1-octen-3-ol, 6PP, Harzianic acid, Harzinalone, and Hydrophobic proteins including Hydra 1; from *Bacillus*, Lipopeptides including surfactin, iturin, esperin, lichenysin, and pumilacidin; and from *Pseudomonas*, Thuricin.

The present invention is not to be limited in terms of the particular embodiments described in this application, which are intended as single illustrations of individual aspects of the invention. Many modifications and variations of this invention can be made without departing from its spirit and scope, as will be apparent to those skilled in the art. Functionally equivalent methods and apparatuses within the scope of the invention, in addition to those enumerated herein, will be apparent to those skilled in the art from the foregoing descriptions. Such modifications and variations are intended to fall within the scope of the appended claims. The present invention is to be limited only by the terms of the appended claims, along with the full scope of equivalents to which such claims are entitled. It is to be understood that this invention is not limited to particular methods, reagents, compounds compositions or biological systems, which can, of course, vary. It is also to be understood that the terminology used herein is for the purpose of describing particular embodiments only, and is not intended to be limiting. In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood b one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. All patents, patent applications, provisional applications, and publications referred to or cited herein are incorporated by reference in their entirety, including all figures and tables, to the extent they are not inconsistent with the explicit teachings of this specification.

Other embodiments are set forth within the following claims.

What is claimed is:

1. A composition consisting of a microbial species in combination with one or more agricultural chemicals, and optionally a microbe-derived metabolite:
    wherein the only microbial species added to said composition is one or more microbial species selected from the group consisting of *Trichoderma virens* strain K1 (ATCC 20906), *Trichoderma atroviride* strain K5 (NRRL B-50520) or mixtures thereof;
    wherein the only microbe-derived metabolite, optionally, added to said composition is one or more microbe-derived metabolite selected from the group consisting of 6-pentyl pyrone, harzianic acid, hydtra 1, harzinolide, 1-octene-3-ol or mixtures thereof;

wherein said one or more agricultural chemicals are selected from the group consisting of a fungicide, an insecticide, a nematicide, a bacteriocide, an herbicide, a surfactant, an emulsifier, a coloring agent, an inert conformulant, or a mixture thereof; and wherein, optionally, one or more of said microbial species, said microbe-derived metabolite or said agricultural chemicals are suspended in one or more liquids.

2. The composition as recited in claim 1 wherein said microbial species is suspended in one of an oil or water.

3. The composition as recited in claim 2 wherein said microbial species is suspended in an oil and said one or more agricultural chemicals is suspended in an aqueous liquid.

4. A method of enhancing a crop, comprising applying the composition according to claim 1 by a method selected from the group consisting of onto a seed of the crop, in a furrow containing the crop, by a soil drench of soil containing the crop, by a root dip onto the crop, by a foliar spray onto the crop, by a side dress onto the crop, and mixtures thereof.

\* \* \* \* \*